United States Patent
Dorn et al.

(10) Patent No.: US 8,850,334 B2
(45) Date of Patent: Sep. 30, 2014

(54) ACTIVE Z ORDER MANIPULATION OF A POPUP WINDOW IN MULTIMONITOR SYSTEMS

(75) Inventors: Karlheinz Dorn, Kalchreuth (DE);
Oliver Graf, Baiersdorf (DE); Christian Scharf, Herzogenaurach (DE);
Hans-Martin Von Stockhausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 899 days.

(21) Appl. No.: 11/373,213

(22) Filed: Mar. 13, 2006

(65) Prior Publication Data

US 2006/0206825 A1   Sep. 14, 2006

Related U.S. Application Data

(60) Provisional application No. 60/660,999, filed on Mar. 14, 2005.

(51) Int. Cl.
*G06F 3/048* (2013.01)
*G06F 3/0481* (2013.01)

(52) U.S. Cl.
CPC .................................. *G06F 3/0481* (2013.01)
USPC ........... 715/761; 715/781; 715/788; 715/790; 715/791; 715/794; 715/795; 715/796; 345/1.1

(58) Field of Classification Search
CPC ... G06F 3/0481; G06F 3/1423; G06F 3/1431; G06F 3/1454
USPC ......... 715/761, 781, 788, 790–791, 794–796; 345/1.1

See application file for complete search history.

(56) References Cited

U.S. PATENT DOCUMENTS

| | | | |
|---|---|---|---|
| 5,499,334 A | 3/1996 | Staab | |
| 5,835,090 A * | 11/1998 | Clark et al. | 715/764 |
| 6,018,340 A * | 1/2000 | Butler et al. | 715/764 |
| 6,229,542 B1 | 5/2001 | Miller | |
| 6,331,840 B1 * | 12/2001 | Nielson et al. | 345/1.1 |
| 6,509,911 B1 | 1/2003 | Shimotono | |
| 6,919,864 B1 * | 7/2005 | Macor | 345/1.1 |
| 2004/0075623 A1 * | 4/2004 | Hartman | 345/1.3 |
| 2004/0098462 A1 * | 5/2004 | Horvitz et al. | 709/207 |
| 2004/0201621 A1 * | 10/2004 | Stevens | 345/751 |

FOREIGN PATENT DOCUMENTS

| EP | 1 134 645 A1 | 9/2001 |
|---|---|---|
| EP | 1 134 645 B1 | 12/2004 |

OTHER PUBLICATIONS

German OA dated Jun. 25, 2012.

* cited by examiner

*Primary Examiner* — Amy Ng
*Assistant Examiner* — Sajeda Muhebbullah
(74) *Attorney, Agent, or Firm* — Harness, Dickey & Pierce, P.L.C.

(57) ABSTRACT

A method and apparatus are disclosed for controlling positioning for a child window, produced by a main window, on at least one monitor in a multimonitor computer system, where a first and a second positioning mechanism control the positioning of the child window on the monitors such that the child window is positioned at the topmost position and fully visibly on all monitors.

22 Claims, 2 Drawing Sheets

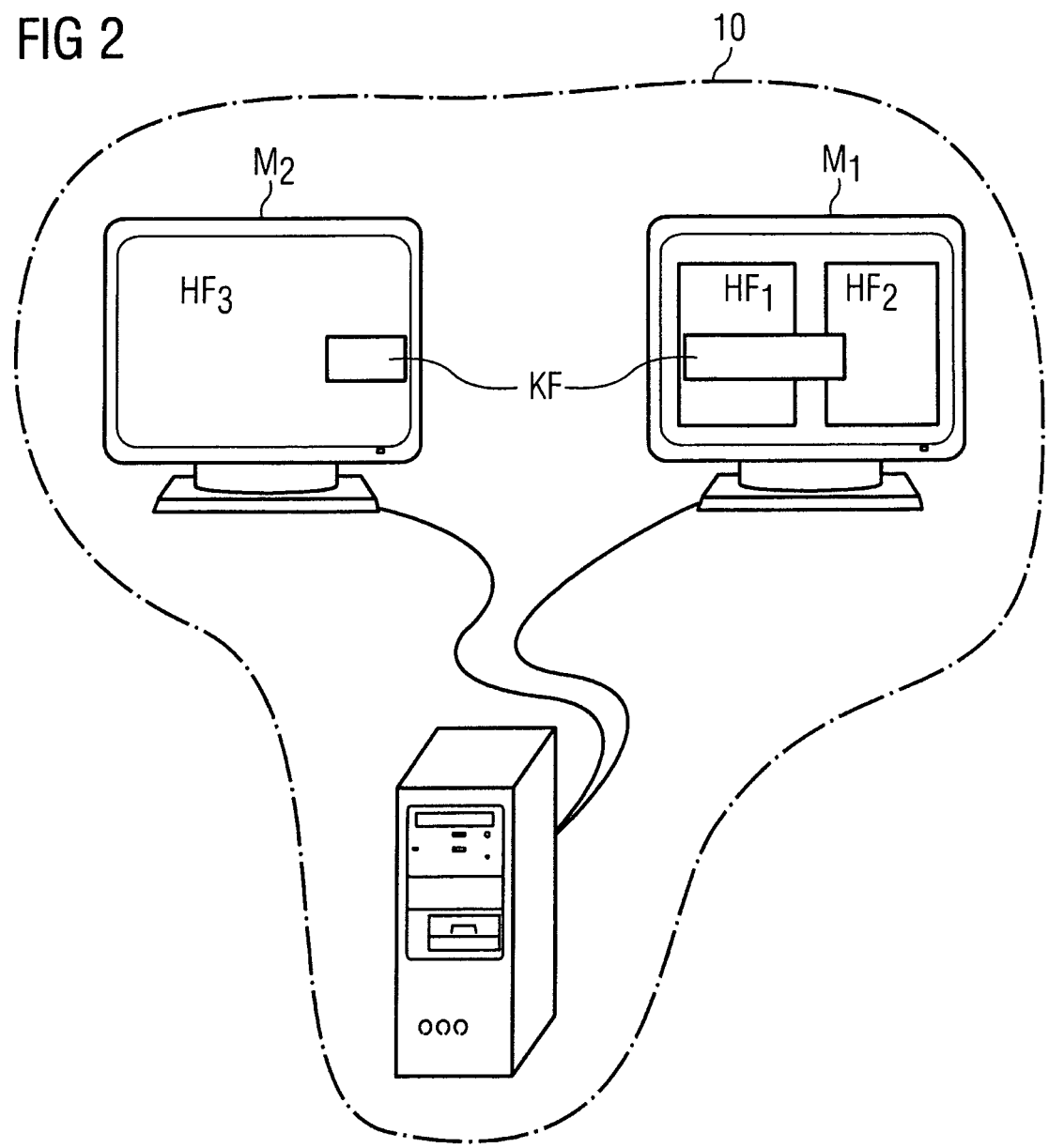

ACTIVE Z ORDER MANIPULATION OF A POPUP WINDOW IN MULTIMONITOR SYSTEMS

The present application hereby claims priority under 35 U.S.C. §119 on U.S. provisional patent application Ser. No. 60/660,999 filed Mar. 14, 2005, the entire contents of which is hereby incorporated herein by reference.

FIELD

The invention generally relates to the field of positioning or arranging windows on a screen.

BACKGROUND

Most operating systems in use today, operate using the window technique (windowing), which allows a user to work on different applications at the same time and to control them using the user interface.

It is customary practice today firstly to equip a workstation with a plurality of monitors, so that the user can distribute his applications over two or more monitors—and not over just one monitor, as previously customary. Secondly, there are fields of engineering, such as medical engineering, which require that a relatively large group of people be able to work with an application. These include, by way of example, scenarios for obtaining results for a patient using one or more imaging applications. In this case too, it makes sense for particular windows of the respective application to be distributed, positioned or displayed on a plurality of monitors.

In the operating systems in use today, e.g. Windows, Linux etc., provision is made for user interactions to be executed using a—possibly graphic—interface. That is to say that all the necessary interactions between the application and the user take place using specific windows which appear on the screen. Both the respective application and the underlying operating system send their messages (e.g. required user inputs, status information or warnings from the application or from the operating system etc.) using moving windows, known as popup windows or popups for short, which appear on the monitor when a specific event occurs.

Since a plurality of applications are usually executed in parallel, that is to say at the same time, a plurality of windows normally need to be displayed on a monitor. An application usually has a main application window. The application or the main window can respectively produce at least one child window which is derived from it. The child window is a menu or message window of any type in a respective application. These include popups with an input request or popups with warnings, for example.

To ensure a smooth operating sequence which is as optimum as possible for a plurality of applications and hence for a plurality of main windows on a monitor, a particular method for positioning the various windows on a monitor is known for systems from the prior art. This positioning mechanism is intended, in particular, to ensure that a popup window in an application is always visible to the user and hence is opened over the main window of the respective application. This makes it possible to ensure that the user actually sees the data displayed in the popup window (e.g. the warnings) immediately. In addition, this makes it possible to ensure that all popup windows are positioned visibly on the monitor without any further activity by the user.

In the Windows systems and derivatives thereof, this positioning mechanism is based on a "Z order". In similar fashion to the mathematical Z axis in a coordinate system, the respective windows in the applications are arranged on an imaginary line which runs at right angles to the monitor.

The windows are arranged on a stack, so to speak, with the first element of the stack also appearing at the topmost position on the monitor and hence always being visible, while the last element of the stack is arranged right at the back in the Z order and it is hidden by the windows positioned in front of it. Each window which is to be displayed on the monitor has a unique position within this Z order. Depending on the arrangement in this Z order, a window may be fully visible or fully or partly hidden by others.

Other parameters which are crucial to the representation of the window on the monitor besides the positioning of a window are, by way of example, its size, its positioning relative to the other two axes (x and y axes of the coordinate system) and/or its type. Usually, a window is a rectangular screen sector. However, it is also possible for further elements of a user interface to be included, e.g. control elements such as buttons, scrollbars etc. In Windows-based systems, a "Window Manager" controls the arrangement of the windows.

Two separate sections are defined in the Z order: a topmost area and a normal area. For the topmost area, it is true that all windows which are situated in this area are guaranteed to be displayed in front of all other windows and are thus always visible. By contrast, the windows in the normal area may be hidden by other windows.

The control of the positioning for single-screen or single-monitor systems to date can be used to ensure that a child window generated by a main application or by a main window is situated at the topmost area and can therefore be guaranteed to be displayed fully on the monitor of the main window. The mechanism is based on a scheme which is usually used for windows systems in the prior art, namely on the Z order.

The concept of the Z order is derived from a predecessor/successor hierarchy and defines a "before/after" or an "above/below" arrangement. All the windows on a monitor are therefore depicted within this Z order hierarchy. This hierarchy starts at the desktop window as root window. As the direct successors or children of the desktop window, a plurality of main windows may be arranged on a "top-level window level". A respective one of these main windows can then again be split into one or more child windows, in a manner of a tree. These child windows may be popup windows or other child windows. A child window can have only one main window as predecessor.

A problem in previous window control systems arises when the system is intended to be extended to a multimonitor system. A multimonitor computer system is usually used such that a first application is displayed on a first monitor and a second application is displayed on a second monitor. It is naturally also possible to extend the system to more than two monitors, so that further windows can be positioned on the further monitors.

In previously known systems, one problem is now that a child window in an application can be controlled only for the monitor on which the application or the associated main window is located. In previously known systems, it is therefore only possible to ensure that a child window is in the topmost area in relation to the main window of the respective application—and hence only in relation to a monitor. For multimonitor systems, this problem has not been solved to date.

SUMMARY

At least one embodiment of the invention is includes an object of demonstrating a way which can be used to ensure that all of a multimonitor system's child windows generated by at least one main application can be displayed fully visibly on all monitors.

Particularly in the field of medical engineering, the relevance of this problem scenario is obvious. If, for example, the first application is one controlling the taking of X-rays for a patient and the second application is one controlling the imagery production for the generated X-ray image, the first application is usually executed with the first main window on a first monitor and the second application is usually executed with the second main window on a second monitor. If the first application now encounters an error—e.g. an error in the data capture—then an appropriate popup window appears from the main window of the first application. Even in the case of a dual-screen system, it is now necessary to ensure that this popup window appears fully visibly to the user on the second monitor too, so that there is no resultant unnecessary delay in the operating sequence.

On the basis of the known method, the popup window in the case just outlined would appear only on the first monitor for the first application as the topmost Z-order element and not on the second monitor. On the second monitor, the popup window would either not appear at all or would appear only in part, since it would be hidden by the main window of the second application. Particularly in the field of medical-engineering applications, this problem holds a high safety risk and will therefore be rated as very critical, since in the example just outlined the patient should not be exposed to an unnecessarily long period of radiation (through delays in the X-ray image capture). To date, it has therefore been entirely the responsibility of the respective user to keep an eye on all monitors at the same time and to monitor them particularly for the appearance of popups with warnings.

An aim of at least one embodiment of the present invention is therefore also to demonstrate a way in which the monitoring for popup windows which has just been outlined in a multimonitor system can be automated.

An object may be achieved by a method and/or an apparatus.

In particular, an object may be achieved by a method of at least one embodiment, for controlling positioning for a child window in a multimonitor computer system, in which a plurality of applications are running in parallel which each have a main window which is respectively associated with at least one of the monitors such that the main windows do not overlap, where the child window is respectively produced by a main window, and is positioned on the basis of a first positioning mechanism at the topmost position on the first monitor of the producing main window, and where the control for the positioning of the child window accesses a further positioning mechanism, which controls the positioning of the child window when it is to be displayed fully or proportionally on at least one further monitor, with which the main window producing the child window is not associated, where the further positioning mechanism positions each main window which is associated with the further monitor respectively at the bottommost position on the further monitor, so that the child window is also positioned on the further monitor fully visibly at the topmost position.

At least one embodiment of this invention therefore makes provision for a plurality of applications to run on the multimonitor system which each generate at least one main window. A main window is therefore uniquely associated with an application. Since there are a plurality of applications which can be executed in parallel, there are also a plurality of main windows which need to be positioned on or distributed over the monitors. Usually, there is provision for a respective main window to be positioned on a respective monitor.

Usually, however, it is also necessary to cover scenarios in which there are more applications than monitors. Thus, a plurality of main windows (from a plurality of applications) also need to be displayed on a monitor. This is possible by virtue of an order for the windows being defined which provides for a stack-like arrangement of the windows behind one another or by virtue of the respective main windows being reduced in size such that all can be positioned and displayed in parallel, that is to say simultaneously next to one another, that is to say without overlapping.

In this case, however, the monitoring problem solved by at least one embodiment of the invention is not relevant, since a user can easily obtain an overview of a plurality of main windows on just one monitor. This becomes significantly more difficult if there are a plurality of main windows on a plurality of monitors, however. Normally, a main window is associated with a monitor in full-screen mode in each case (that is to say the typical multimonitor scenario). If the monitors used are not directly next to one another, it may even be impossible to obtain an overview of all the windows on both monitors at the same time. The problem is intensified if more than two monitors are used.

A child window is defined by virtue of it being generated by a main window (which for its part is associated with an application) and thus being functionally dependent thereon and by virtue of it moving (on the monitor) and not taking up the full screen. All applications have at least one main window, regardless of whether or not they include a graphical user interface (GUI).

The further or second positioning mechanism which at least one embodiment of the invention uses, transfers the previous concept for defining the order for the arrangement of the respective windows to multimonitor systems, so that there is the assurance that all child windows are fully visible and are not hidden, even and particularly also when they have been moved to a different monitor.

In known systems, the Z order is defined for all windows only to the extent that, in certain cases, a child window may be covered by another main window in a multimonitor system. Previous systems are therefore found to be unsatisfactory and cannot therefore be transferred unchanged to multimonitor systems or used for these.

However, the inventive solution of at least one embodiment solves this recognized problem by way of a further positioning mechanism which is used on the further monitor and is thus also executed for child windows which belong to an "extraneous" main window (that is to say to a main window from a different application which is being displayed on a different monitor). If more than two monitors are being used, at least one embodiment of the invention provides for the number of monitors to correspond to the number of positioning mechanisms. The underlying principle is maintained, however. The positioning mechanisms for the further monitors ensure that all child windows are guaranteed to be displayed fully visibly at the topmost position and therefore cannot be overlooked. This positioning mechanism is based in an example embodiment on the Z order. In alternative embodiments, however, any other arrangement principles may be used here.

The original positioning mechanism for the second monitor is actively manipulated by the inventive method of at least one embodiment by arranging the full-screen main application windows of this monitor, which would originally be arranged as the topmost elements in the hierarchy defined by the Z order, as the last (that is to say bottommost) element within the Z order. This has the desired effect that all child windows, particularly all dialogue windows, are at the top in relation to the Z order. This makes it possible to ensure that these windows are guaranteed not to be covered, regardless of whether they have been positioned on their source monitor or whether they have been positioned by an "extraneous" main window (possibly on an "extraneous" monitor).

This active manipulation of the Z order takes place, in line with at least one embodiment of the invention, at pre-settable times. In line with the invention, it is possible to set when the mechanism for actively reorganizing the Z order is triggered. In on example embodiment of the invention, there is a preset that the mechanism is triggered by a particular event in the Window Manager, namely when the Window Manager notifies the application that its window is to be moved in the Z order. In line with at least one embodiment of the invention, the method therefore includes an interface to the Window Manager, particularly to the Win32 Window Manager, in the case of the Windows operating system.

However, it is likewise possible to apply the principle of embodiments of the invention to other operating systems. In that case, this positioning mechanism is actively manipulated on the basis of the aforementioned scheme based on at least one embodiment. The inventive solution of at least one embodiment therefore also includes systems in which the positioning mechanism is not based on the Z order, but rather on a different organization mechanism.

In one alternative embodiment of the invention, a respective main window can be explicitly supplied to an inventive monitoring operation which ensures that all child windows from this application or from this main window are displayed fully visibly at the topmost position of a positioning mechanism. Provision is therefore made for the active manipulation of the second positioning mechanism to be preceded by an additional method step: namely the method step of identifying the main window which is to be monitored or the quantity of main windows which are to be monitored.

Advantageously, provision is made for automatic detection of that application with which the user is currently interacting or that application which the user wishes to activate. Normally, this is done by virtue of the user executing activities on a window (main window or child window) associated with the respective application. These may be mouse clicks or other user inputs, for example. These activities by the user are used to activate the respective application on the basis of the known method.

Other applications which are likewise executed in parallel are not activated. The user can therefore only ever activate one application at a time. In this case, it is conceivable to have, by way of example, scenarios in which an application is activated while one or more further applications are running in the background and, by way of example, downloading data from the Internet.

All processes which are intended to run in the background are marked as "deactivated". The distinction between active and inactive windows is made by different types of visual display on the monitor (e.g. light for active and dark for inactive). In one alternative embodiment, however, provision may be made for a plurality of applications to be intended to be marked as activated simultaneously.

Depending on the respective application and depending on the operating system, there are a plurality of basic options for displaying (e.g. in relation to their size, form, representation) movable child windows for an application on the monitor relative to the x and y axes (and not relative to the z axis). In this case, it is possible that the child windows overlap. In any case, the inventive mechanism ensures that all child windows are displayed fully, regardless of whether or not they come from the main window of the monitor on which they are intended to be displayed (that is to say from an extraneous main window).

In one alternative embodiment of the invention, a child window for an application does not appear on the monitor of this application fully, but rather only proportionally. One portion of the child window is displayed on the first monitor (which is associated with the producing main window), while the remaining portion of the child window is displayed on a further, second monitor, which is not associated with the producing main window. In this case, there is therefore provision that the child window always appears in a central area in relation to the overall display and hence "between the monitors", so to speak.

The overall display is obtained when the image is taken as a basis, which is the result when all the monitors used are placed directly next to one another and the windows displayed on them are shown. A fundamental feature in this case is that the remaining portion of the child window (which is to be displayed on the extraneous monitor) is also guaranteed to appear at the topmost position of the windows on the extraneous monitor on the basis of the further positioning mechanism, and is therefore fully visible.

If provision is therefore made for a child window, in principle, to be displayed only proportionally on the monitor which is associated with the main window, the second positioning mechanism is used to position the remaining proportion on the second monitor on the arrangement level (in the Z order), as the first positioning mechanism provides in appropriate fashion for the respective child window on the original monitor.

In line with at least one embodiment of the invention, distribution of the proportions may be in the range between 0 and 100% on the respective monitors. In one example embodiment, however, a child window is displayed on a monitor in a proportion of 100% (in this case, there is no stipulation of whether or not the monitor is associated with the producing main application).

In one example embodiment of the invention, the control for the positioning for the child window takes place centrally. This has the advantage that just one central component can be used to define an action for any applications. The inventive solution of at least one embodiment indicates that it is therefore no longer necessary to control each application individually. In addition, an advantage can be seen in the fact that already existing applications do not need to be adapted so that the inventive display mechanism can be used for child windows.

If a child window is displayed only proportionally on a first source monitor, at least one embodiment of the invention makes it possible to ensure that this window is fully visible in all cases, since the further proportion of the child window, which is to be displayed on the further monitor, is arranged at the topmost position, so that the child window is fully visible overall.

In one alternative example embodiment of the invention, in principle all child windows of all applications are positioned at the topmost position on the respective monitors. In this case, dialogue windows and popup windows appear even from applications which are running in the background and have not currently been activated by the user. This increases the security of the system, since in principle all child windows are displayed.

In another advantageous example embodiment of the invention, the second positioning mechanism (that is to say the positioning mechanism which is related to the second monitor) for an extraneous main window (that is to say for a main window of an extraneous application, that is to say which is displayed on another monitor) is activated as soon as a change of position for the main window (on the other monitor) has been detected. Normally, this is detected by way of a message from the Window Manager in the Windows operating system.

The automatic control and/or the automatic positioning of the child window or of the child windows at the topmost position in the arrangement hierarchy allows the security of the overall system to be significantly increased, since in principle all warnings are displayed. In addition, the inventive solution of at least one embodiment makes it possible to ensure that a child window is positioned proportionally or fully and completely visibly on each of the monitors used. This gives rise to the advantage that the user himself is then not able to make an error by ignoring warnings if he is looking at just one monitor in the multimonitor system and is possibly devoting his attention to just a different application.

In one advantageous example embodiment of the invention, a main window is displayed on a monitor in full-screen mode in each case, in principle. If a plurality of main windows are to be displayed, these are distributed over or moved to the respective monitors provided for this purpose.

Alternatively, it is possible for a main window not to be displayed in full-screen mode, but rather to take up just a portion of the screen. This allows a plurality of main windows and hence a plurality of applications to be displayed on a monitor in parallel. For this scenario too, at least one embodiment of the inventive solution can be applied by positioning a child window, produced by a main window, fully visibly and at the topmost position of the Z order on the monitor regardless of whether other main windows of other applications are also to be displayed on the same monitor. In the latter case, in which a plurality of main windows are displayed on one monitor, it is fundamental that the main windows are positioned so as not to overlap.

An alternative way of achieving an object is an apparatus based on the accompanying, coordinate main example method and, in particular, provides an apparatus which has devices/programs intended for carrying out the method described above or at least a feature of the method as described above.

The inventive embodiments of the method which have been described above may also be in the form of a computer program product, with the computer being prompted to carry out the inventive method described above, and the latter's program code being executed by a processor.

One alternative way of achieving the object provides a storage medium which is intended to store the computer-implemented method described above and which can be read by a computer.

It is also possible for individual components of the method described above to be able to be executed in a saleable unit and for the rest of the components to be able to be executed in another saleable unit—in the form of a distributed system so to speak. Another way of achieving the object in line with at least one embodiment of the invention is therefore a product for a multimonitor system for controlling positioning for a child window which is to be displayed proportionally on a plurality of monitors in the system, comprising:

a plurality of main windows, with one main window being used as a user interface for a respective application,
a plurality of monitors on which the main windows are positioned,
a first positioning mechanism, which controls the positioning of the child window on the first monitor, and with a second positioning mechanism, which controls the positioning of the child window on the second monitor, the second positioning mechanism positioning the child window at the topmost position relative to the other windows of the second monitor on the second monitor, where the product comprises means which are set up to carry out those steps of a method based on at least one of the method aspects described above which are brought about by the product, with at least one further product being set up to carry out the remaining steps of the method, so that the interaction of the two products carries out all the steps of the method.

BRIEF DESCRIPTION OF THE DRAWINGS

The detailed description of the figures which follows discusses example embodiments, which are to be understood to be nonrestrictive, with their features and further advantages with reference to the drawings, in which:

FIG. 2 shows a schematic illustration of a window arrangement based on an alternative embodiment of the invention with three monitors.

DETAILED DESCRIPTION OF THE EXAMPLE EMBODIMENTS

A multimonitor system 10 includes a multiplicity of monitors M, $M_1, M_2, \ldots M_w$, where w>2. In one example embodiment of the invention, the system includes two monitors $M_1$ and $M_2$.

The computer system 10 can execute a plurality of applications in parallel. Each application has at least one main window HF as a user interface. Normally, the respective applications with their main windows HF are distributed over the respective monitors M such that a main window HF can be displayed in full-screen mode.

Figure 1A:
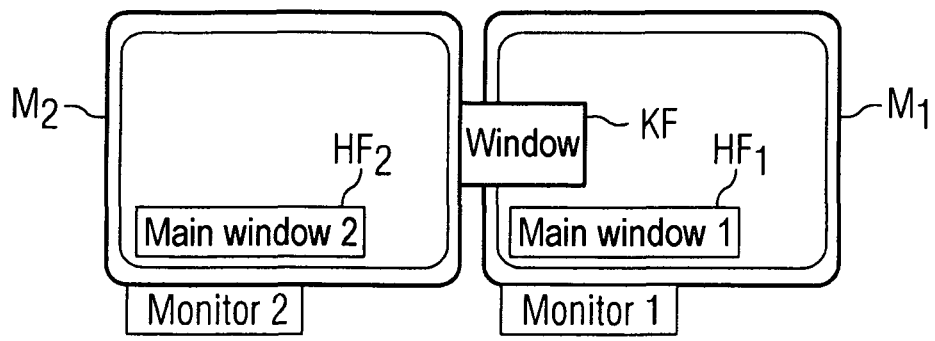
FIG. 1a shows a schematic illustration of a window arrangement without a mechanism based on at least one embodiment of the invention.
Figure 1B:
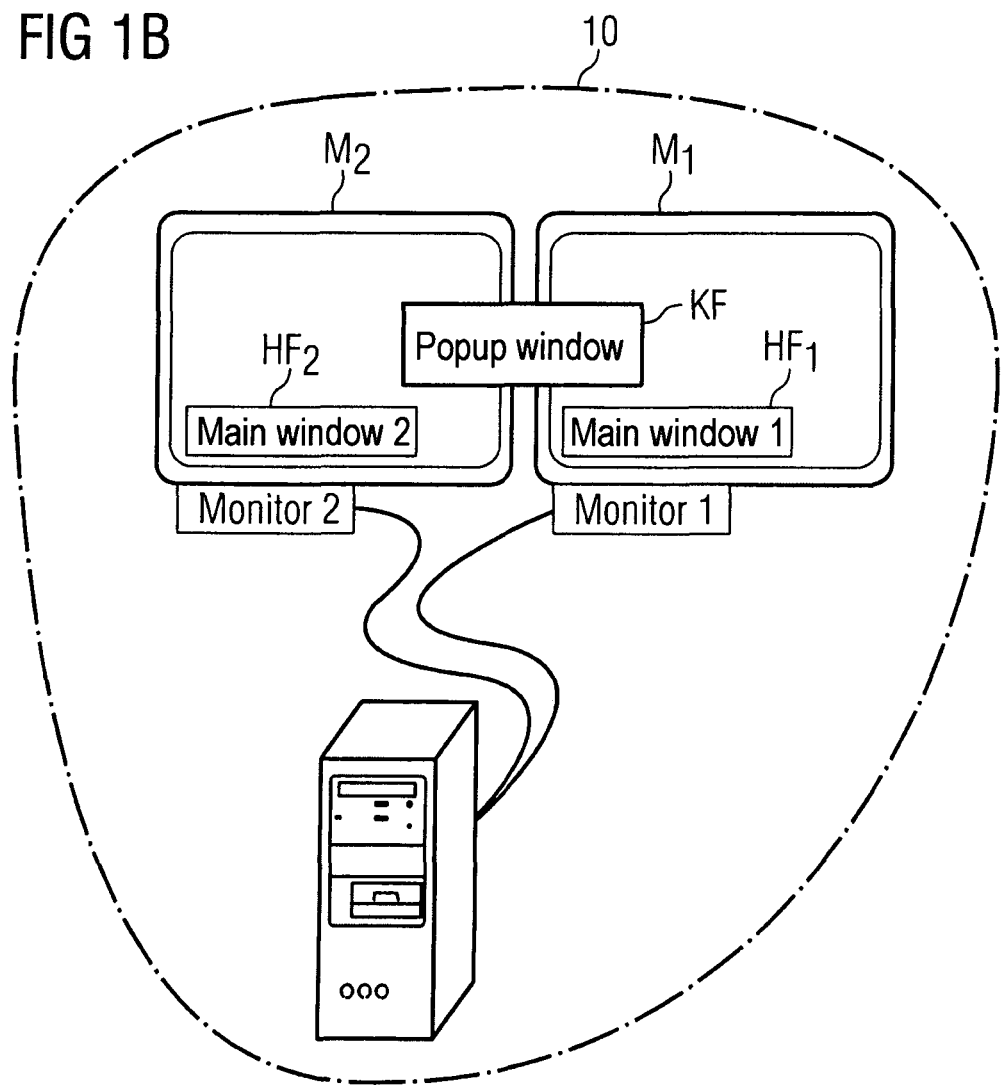
FIG. 1B shows a schematic arrangement of a child window with a positioning mechanism based on at least one embodiment of the invention.

In the embodiment of the invention which is shown in FIG. 1B, the computer system 10 comprises two monitors $M_1$ and $M_2$. In this case, the monitor $M_1$ has the appropriate main window $HF_1$ of the relevant application arranged on it, and the monitor $M_2$ has the main window $HF_2$ positioned on it.

In principle, it is possible for the application to generate a child window KF, particularly a popup window for dialogue with the user. To ensure that the operating sequence is as loss-free as possible, provision is made for the generated popup windows to be displayed visibly, that is to say at the topmost position on the screen.

In a multimonitor computer system 10 based on Microsoft Windows, a positioning mechanism is provided, particularly a "Z order", according to which a plurality of windows are displayed in a hierarchy in stack form on a monitor M. In principle, it is possible to display a plurality of windows on a monitor M in different ways: overlapping, covering, transparently, in the same size, in different sizes, etc. The Z order corresponds to a positioning order in which the windows which are to be displayed on the monitor M are arranged on an imaginary stack and are displayed in staggered succession, for example, with just the topmost window being fully visible and the windows arranged behind it being respectively hidden by the preceding ones.

If the windows-based positioning mechanism known from the prior art is now used unchanged in a multimonitor system, the picture shown in FIG. 1a may sometimes arise. Although the Z order ensures that the child window KF which has been produced by the main window $HF_1$ is displayed on the respective monitor $M_1$ as the topmost or first element and is thus visible to the user, it is possible that the child window KF for the other monitor—such as for the monitor $M_2$ shown in FIG. 1a—is hidden by another main window $HF_2$ associated with this other monitor. The positioning of the child window KF shown in FIG. 1a is thus obtained: the child window which has been produced by the main window $HF_1$ is arranged, in line with the previous action, as the topmost element in the Z order hierarchy on the monitor $M_1$, but this child window KF is hidden in the disadvantageous known method when positioning the windows on the monitor $M_2$ and is thus displayed not fully visibly, since the child window or popup window KF has not been produced by the main window $HF_2$ on monitor $M_2$, but rather by the main window $HF_1$ on monitor $M_1$. The previous positioning mechanism from the prior art therefore cannot be transferred unchanged to multimonitor systems without having to accept popup dialogues being positioned erroneously, particularly in a way which adversely affects the security of the overall system. This serious shortcoming can be reliably avoided by the inventive solution.

Particularly in time-critical applications, such as medical-engineering applications or applications in the field of production engineering, it is necessary for a generated child window KF to be able to be seen directly and immediately on all monitors by the user for the purpose of further handling, even if the child window is intended to be displayed on a monitor which is associated with another (extraneous) main window. If one imagines that, in particular, warnings and other control functions are processed via such child windows KF, it becomes clear that the positioning of the child window KF on all monitors M, $M_1$, $M_2$, . . . is a very basic criterion for correct operation of the overall system.

If, by way of example, a first application is designed to capture data using a computer tomograph and if this application has been moved to the monitor $M_1$ and the user has moved a second application to the monitor $M_2$, which application is designed merely for displaying data, then it is normally not possible to position the two monitors $M_1$ and $M_2$ directly next to one another (as depicted theoretically in FIGS. 1a and 1b). It is therefore entirely possible that a user may not have the two monitors $M_1$ and $M_2$ in view simultaneously. If the user now turns to the monitor $M_2$ with the main window $HF_2$, it is not possible in previous systems based on the prior art to see the child window KF from the first application, which is running on the first monitor $M_1$. This disadvantageous scenario is shown in FIG. 1a.

FIG. 1b shows the arrangement of the windows which have been positioned using the inventive method of at least one embodiment. In the same scenario as has been described above with reference to FIG. 1a, the inventive positioning mechanism results in the child window KF now being fully visible on the second monitor $M_2$.

The main window $HF_1$ has therefore generated a child window KF which is to be displayed partly or fully on the monitor $M_1$ at the topmost position of the Z order so that it is visible to the user. In line with at least one embodiment of the invention, the second positioning mechanism for the monitor $M_2$ is provided which is able to exchange data with the first positioning mechanism for the first monitor $M_1$ and now actively manipulates the Z order for the windows on the second monitor $M_2$, so that the full-screen main application windows HF of the second monitor $M_2$ are sorted as the last or bottommost element in the Z order. This makes it possible to ensure that all popup windows are at the top in relation to the Z order and are guaranteed to be displayed without being hidden. This effect is independent of whether the child windows KF are to be positioned on their source monitor (in this case $M_1$) or in front of an "extraneous" main window (in this case: the one displayed on the second monitor $M_2$). In line with the invention, the scenario illustrated in FIG. 1b is obtained, in which the popup window KF is positioned fully visibly on the monitors $M_1$ and $M_2$.

FIG. 1 shows the scenario in which a child window KF is to be displayed proportionally on a first monitor $M_1$ and on a second monitor $M_2$. Besides the scenario depicted in FIG. 1, in which a child window KF is to be positioned between the monitors $M_1$ and $M_2$, at least one embodiment of the invention also covers scenarios in which the child window KF is to be positioned at another position on the monitors used $M_1$, $M_2$, . . . $M_w$.

Provision may therefore be made for the child window KF always to be displayed fully on one of the monitors M; in this case, it is of no significance whether or not this monitor is associated with the producing main window $HF_1$.

At least one embodiment of the inventive method is used to detect all position changes in relation to the Z order of the second monitor, on which the child window KF is to be displayed. If the Window Manager plans to position another window as the topmost window, at least one embodiment of the invention intercepts execution of this instruction and the respective main window HF is actively arranged as the last element in the Z order on the monitor—its Z order position is reset—or manipulated—before it is displayed on the monitor $M_2$, so to speak—so that it is actively forced into the background. One advantage of at least one embodiment of the inventive system can be seen in that the method can be used on any number of monitors when the respective main windows HF are being displayed without overlapping.

Another advantage of at least one embodiment of the inventive method can be seen in that the method can be used together with any other applications, since the active manipulation of the Z order is effected by the main window HF itself and therefore no conditions are imposed on the respective child windows KF. It is thus possible to ensure that none of the generated child windows KF are hidden.

One advantage which is found to be fundamental in practice can be seen in that the implementation of at least one embodiment of the invention requires no basic changes to the prior art (as shown in FIG. a), but rather at least one embodiment of the invention can also be added, in principle, retrospectively as a chip—particularly as a modified or additional computer program product. The use of at least one embodiment of the inventive positioning mechanisms allows the topmost functionality—as is known to date—to be available to the applications as usual in future too.

In one advantageous embodiment of the invention, provision is additionally made for the respective main application window HF, following manipulation of the Z order on the further monitor, particularly on the second monitor $M_2$, to inform all further windows for which the inventive mechanism has been activated about the manipulation of the Z order. Advantageously, this makes it possible to ensure that a previously defined order for the Z order is maintained within this group of windows and that no further changes to the windows become necessary. Preferably, the respective main application window HF is notified by setting an appropriate flag. Other alternative mechanisms for communicating the event are also conceivable in this case, however.

FIG. 2 shows the scenario in which two applications are being executed on the first monitor $M_1$, using the two main windows $HF_1$ and $HF_2$, with the two main windows $HF_1$ and HF$_2$ needing to be displayed on the monitor M$_1$ without overlapping. The third application with the main window HF$_3$ has been moved to the second monitor M$_2$. If the first application or the main window HF$_1$ now generates a child window KF which needs to be positioned between the monitors M$_1$ and M$_2$, at least one embodiment of the invention provides for the child window KF to be positioned at the topmost position of the Z order, and hence to come to rest above the main windows HF$_1$, HF$_2$ and HF$_3$. This makes it possible to ensure that all child windows KF and in this example the popup window KF generated by the main window HF$_1$ are fully visible on both monitors M$_1$ and M$_2$ and are not hidden by any of the current main windows HF$_1$, HF$_2$ and HF$_3$.

At least one embodiment of the inventive apparatus in an example embodiment is a module which can be integrated as an element in a graphics card or has an interface to the graphics card as an independent product and positions the child window KF in the manner described above.

The text below illustrates a detail from an implementation of a main window HF, this implementation being intended to illustrate the fundamental core of the active Z order manipulation. As soon as the window HF$_1$ receives the message from the runtime environment, that its position in the Z order needs to change ("WM_WINDOWPOSCHANGING") and it is not at the bottommost position in relation to the Z order, the window HF actively prompts it to be transferred to the bottom end of the Z order chain:

```
LRESULT CmainFrame::WindowProc (UINT message, WPARAM wParam, LPARAM lParam)
{
    caseWM_WINDOWPOSCHANGING
    {
        WINDOWPOS*pWndPos= (LPWINDOWPOS) lParam;
        If ((pWndPos ! =NULL) &&
            (pWndPos->hwndInsertAfter! =NULL) &&
            (pWndPos->hwndInsertAfter!    =HWND_BOTTOM)
            && !m_bInternalReorderTrigger) {
            pWndPos->hwndInsertAfter = HWND_BOTTOM;
            UINT uiFlags =SWP_NOACTIVATE|
            SWP_NOOWNERZORDER;
            PWndPos->flags |= uiFlags;
            If (m_uiMsgld4Zorder) {
                ::PostMessage (HWND_BROADCAST,
                m_uiMsgld4Zorder, (WPARAM) (m_hWnd) , 0);
            }
        }
    }
    break;
    ...
}
```

Finally, it will be pointed out that the description of at least one embodiment of the invention and the example embodiments are to be understood as fundamentally nonrestrictive with regard to a particular physical implementation of at least one embodiment of the invention. In particular, it is obvious to a person skilled in the relevant art that embodiments of the invention can be implemented as a distributed system and partly or fully in software and/or hardware and distributed over a plurality of physical products—in this case particularly including computer program products.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of controlling positioning for a first child window in a multimonitor computer system, in which a plurality of applications are running in parallel, wherein each of the plurality of applications includes a main window respectively associated with at least one of a plurality of monitors, and wherein the first child window is produced by a respective main window and the first child window is displayed at a topmost position on a first monitor of the plurality of monitors that produces the first child window based on a first positioning mechanism, the method comprising:

accessing, via a control for the positioning of the first child window, a second positioning mechanism that is configured to control the positioning of a second child window so that the second child window is displayed on at least one another monitor of the plurality of monitors that is separate from the first monitor displaying the first child window; wherein the main window producing the first child window is not associated with the at least one another monitor and the main windows do not overlap, the second positioning mechanism positions at least one main window associated with the at least one another monitor respectively at the bottommost position on the at least one another monitor, so that the second child window is positioned on the at least one another monitor and is completely visible at the topmost position, the first child window visibly overlaps a plurality of the main windows, and the second positioning mechanism manipulates an original positioning for the at least one main window on the at least one another monitor by positioning all full screen main windows of the at least one another monitor at the bottommost position on the at least one another monitor, the second child window being a duplicate of the first child window.

2. The method as claimed in claim 1, wherein the control for the positioning takes place centrally.

3. The method as claimed in claim 1, wherein the first child window is displayed at least one of partly and fully at the topmost position on the first monitor.

4. The method as claimed in claim 1, wherein the first child window is positioned at the topmost position regardless of whether the associated main window has been activated.

5. The method as claimed in claim 1, wherein at least one of the first and the second positioning mechanisms are based on a Z order arrangement.

6. The method as claimed in claim 1, wherein the second positioning mechanism is activated on the at least one another monitor as soon as a change of position for at least one of the main windows positioned on the at least one another monitor has been detected.

7. The method as claimed in claim 1, wherein at least one of the control, the first positioning mechanism and the second positioning mechanism are executed automatically.

8. The method as claimed in claim 1, wherein the first child window includes all subsequent windows produced by the respective associated main window.

9. The method as claimed in claim 1, wherein a plurality of main windows are positioned on at least one of the plurality of monitors so as not to overlap.

10. The method of claim 1, wherein the accessing accesses the second positioning mechanism to control the positioning of the second child window so that the second child window is displayed fully on the at least one another monitor.

11. An apparatus that controls positioning for a child window in a multimonitor computer system, in which a plurality of applications are running in parallel, wherein each of the plurality of applications includes a main window respectively associated with at least one of a plurality of monitors, and wherein the first child window is produced by a respective main window and the child window is displayed at a topmost position on a first monitor of the plurality of monitors that produces the first child window based on a first positioning module, the apparatus comprising:

a processor configured to access a memory device and control the positioning of the first child window; and a second positioning module, a control for the positioning of the child window accessing the second positioning module which controls the positioning of a second child window so that the second child window is displayed on at least one another monitor of the plurality of monitors; wherein the main window producing the first child window is not associated with the at least one another monitor and the main windows do not overlap, the second positioning module positioning at least one main window associated with the at least one another monitor respectively at the bottommost position on the at least one another monitor, so that the second child window is also positioned on the at least one another monitor fully visible at the topmost position, the displayed first child window visibly overlaps a plurality of the main windows, and the second positioning module manipulates an original positioning for the at least one main window on the at least one another monitor by positioning all full-screen main windows of the at least one another monitor at the bottommost position, the second child window being a duplicate of the first child window.

12. The apparatus as claimed in claim 11, wherein the apparatus operates centrally.

13. The apparatus as claimed in claim 1, wherein the first child window is displayed at least one of partly and fully at the topmost position on the first monitor.

14. The apparatus as claimed in claim 11, wherein the first child window is positioned at the topmost position regardless of whether the associated main window has been activated.

15. The apparatus as claimed in claim 11, wherein at least one of the first and the second positioning module is based on a Z order arrangement.

16. The apparatus as claimed in claim 11, wherein the second positioning module is activated on the at least one another monitor as soon as a change of position for at least one of the main windows positioned on the at least one another monitor has been detected.

17. The apparatus as claimed in claim 11, wherein at least one of the control and the positioning modules are executed automatically.

18. The apparatus as claimed in claim 11, wherein the first child window includes all subsequent windows which are produced by the respective associated main window.

19. The apparatus as claimed in claim 11, wherein a plurality of main windows are positioned on at least one of the plurality of monitors so as not to overlap.

20. The apparatus of claim 11, wherein the second positioning module controls the positioning of the second child window so that the second child window is displayed fully on the at least one another monitor.

21. A computer program product, including a computer program stored on a non-transitory computer readable medium, adapted to, when executed on a computer, cause the computer to carry out the method as claimed in claim 1.

22. A non-transitory computer readable medium including program segments for, when executed on a computer, causing the computer to implement the method of claim 1.

* * * * *